United States Patent
Barbulescu

(10) Patent No.: US 10,445,958 B2
(45) Date of Patent: Oct. 15, 2019

(54) METHOD AND SYSTEM FOR GRANTING OR DENYING ACCESS TO A RESTRICTED AREA

(71) Applicant: Continental Automotive GmbH, Hannover (DE)

(72) Inventor: Corneliu Barbulescu, Timisoara (RO)

(73) Assignee: Continental Automotive GmbH, Vahrenwalder Strasse Hannover (DE)

( * ) Notice: Subject to any disclaimer, the term of this patent is extended or adjusted under 35 U.S.C. 154(b) by 0 days.

(21) Appl. No.: 16/135,489

(22) Filed: Sep. 19, 2018

(65) Prior Publication Data

US 2019/0088052 A1 Mar. 21, 2019

(30) Foreign Application Priority Data

Sep. 20, 2017 (EP) .................................... 17465550

(51) Int. Cl.
*G07C 9/00* (2006.01)
*H04W 4/02* (2018.01)
*H04W 4/40* (2018.01)

(52) U.S. Cl.
CPC ........ *G07C 9/00126* (2013.01); *H04W 4/027* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 2006/0069503 A1* | 3/2006 | Suomela | G01C 21/3641 701/431 |
| 2009/0309709 A1 | 12/2009 | Bevacqua et al. | |
| 2010/0082180 A1* | 4/2010 | Wright | B60W 50/0098 701/1 |
| 2011/0015971 A1 | 1/2011 | Hembury | |
| 2015/0243165 A1 | 8/2015 | Elsheemy | |

FOREIGN PATENT DOCUMENTS

| | | |
|---|---|---|
| WO | 00/22595 A1 | 4/2000 |
| WO | 2014/031560 A1 | 2/2014 |
| WO | 2014/146186 A1 | 9/2014 |

OTHER PUBLICATIONS

Search Report dated Mar. 5, 2018 from corresponding European Patent Application No. 17465550.6.

* cited by examiner

*Primary Examiner* — Daniell L Negron

(57) ABSTRACT

Access to a restricted area is granted or denied. An area outside the outer perimeter is monitored by determining an instant speed of the vehicle and interrogating the vehicle to check for access authorization and data identification. It is determined whether the instant speed of the vehicle is too high. Whether the vehicle is authorized to access the restricted area based on the interrogating is determined. Upon determination that the vehicle is authorized to access the restricted area, access to the adjacent area surrounding the restricted area is granted if the speed is not too high; otherwise the vehicle is instructed to slow down its speed. An instant speed of the vehicle in an area surrounding the restricted area is determined. If the determined speed is not dangerous for pedestrians, access is granted to the restricted area.

16 Claims, 2 Drawing Sheets

METHOD AND SYSTEM FOR GRANTING OR DENYING ACCESS TO A RESTRICTED AREA

BACKGROUND

The present disclosure relates to a method and system for granting or denying access to a restricted area. The present disclosure specifically relates to a method and system for granting access of vehicles to restricted area.

Western societies have been challenged by terrorist attacks. Even a substantial effort by law enforcement authorities and intelligence agencies cannot always prevent terrorist attacks.

Recently, terrorist attacks have taken place by using trucks that have been steered into an agglomeration of humans, for example on Dec. 19, 2016 in Berlin in which a truck was driven into the Christmas market next to the Kaiser Wilhelm Memorial Church by a terrorist, leaving 12 people dead and 56 injured or for example on Aug. 17, 2017 in Barcelona in which a van was driven into the crowded street La Rambla leaving 14 people dead and over 100 injured.

Systems for managing access of vehicles to a restricted area are known in the art, however the issue of monitoring access of vehicles in a restricted area with the target to protect people who are in that area and are exposed to be injured by vehicles driven at high speeds in crowded places still needs to be addressed.

BRIEF SUMMARY

It is therefore an objective of the present disclosure to address the issues stated above and to provide a method of system for granting access to a restricted area that works safely.

This objective is achieved by a method according to the independent method claim and a system according to the independent system claim. Dependent claims relate to further aspects of the present disclosure.

The present disclosure relates to a method for granting or denying access to a restricted area. The restricted area is confined by an inner perimeter and surrounded by an adjacent area. The adjacent area is confined by the inner perimeter and an outer perimeter. The method comprises pairing a central processing unit with a mobile device comprised in a vehicle. The central processing unit manages access to the restricted area. The method further comprises monitoring, from the central processing unit, an area outside the outer perimeter by determining an instant speed of the vehicle and interrogating the vehicle to check for access authorization and data identification using a first electronic system; determining, at the central processing unit, that the instant speed of the vehicle is too high if the instant speed exceeds a speed limit; determining, at the central processing unit, whether the vehicle is authorized to access the restricted area based on the interrogating. Upon determination that the vehicle is authorized to access the restricted area, access to the adjacent area surrounding the restricted area is granted if the speed is not too high; otherwise the vehicle is instructed to slow down its speed. The method further comprises monitoring, from the central processing unit, the adjacent area surrounding the restricted area by determining an instant speed of the vehicle by using a second electronic system. Upon determination that the instant speed of the vehicle does not exceed a speed limit deemed dangerous for pedestrians, access is granted to the restricted area.

Hence, the restricted are can only by accessed by vehicle if it has passed two barriers, a first one at the outer perimeter and a second one at the inner parameter. Access to the restricted area is only granted if the vehicle is authorized and has an appropriate speed to enter the adjacent area as well as an appropriate speed within the restricted area, i.e. a speed deemed not dangerous for pedestrians. Specifically, instructing the vehicle to slow down its speed may comprise receiving an acknowledgement from the vehicle with respect to the instruction and granting access to the area surrounding the restricted area if the speed has been slowed down sufficiently. Thus apart, from determining the speed of the vehicle by measuring the speed, the central processing unit may be configured to receive, e.g. via the first or second electronic system, an acknowledgement from the vehicle with respect to its current speed in response to instructing to slowing down the vehicle.

Upon determination that the instant speed is too high within the area outside the outer perimeter, e.g. higher than an official speed limit, the method may comprise broadcasting an alarm to local authorities from the central processing unit.

Determining the instant speed by using the first electronic system may comprises measuring the instant speed of the vehicle by radar. Monitoring the area outside the outer perimeter by using the first electronic system may comprise applying long range radio communications, e.g. cellular communications such as Long Term Evolution or 5G.

Determining the instant speed of the vehicle by using the second electronic system may comprise evaluating GPS signals received from the vehicle. Using the second electronic system may comprise applying short range radio communications, e.g. wireless fidelity.

One aspect of the method relates to guiding a vehicle within the restricted area to a parking spot and from the parking out of the restricted preferably along a specific path. The method may comprise sending, form the central processing unit, to the vehicle a GPS track a driver of the vehicle shall follow to drive to a place within the restricted area. Upon determination that the vehicle has left an approved GPS track, the central processing unit may remotely engage the brakes of the vehicle, e.g. via the second electronic system. Furthermore, the central processing unit may send an alarm to local authorities upon determination that the vehicle has left an approved GPS track. Leaving an approved GPS in the restricted area with pedestrians may pose a serious threat to the pedestrians. By warning local authorities as soon as deviation from the approved GPS track is detected may allow the local authorities to interfere with the vehicle and to stop it before pedestrians are encountered by the vehicle.

One aspect of the method relates applying long range and short range radio communications. Monitoring the area outside the outer perimeter by using the first electronic system comprises applying long range radio communications. Thus, a vehicle can be monitored when it is still far away from the restricted area.

Interrogating the vehicle to check for access authorization and data identification using the first electronic system may comprise applying short range radio communications. Furthermore, monitoring the adjacent area surrounding the restricted area and the restricted area using the second electronic system may comprise applying short range radio communications. The second electronic system may be applied concurrently to the first electronic system. Hence, when the vehicle is within the adjacent area surrounding the restricted, it may be monitored by the first electronic system as well as the second electronic system. Thus, long range and short range radio communications may be applied concurrently providing additional redundancy and thus enhancing the reliability of the method.

One aspect of the method relates to using an agent to interrogate the vehicle at any time. The agent may be equipped with a portable device employing short range radio communications, e.g. a smartphone or a tablet. The agent may interrogate the vehicle to check for access authorization and data identification and may inform local authorities upon encountering a vehicle having an expired authentication. The agent may interrogate the vehicle by sending a short range radio frequency request. Depending on the results received from the vehicle which can be compared automatically to the content of a database hosted by the central processing unit, the agent can take actions according with procedures. The database hosted by the central processing unit can be accessed by the portable device for the comparing.

As above, when an authorization expires due to time or other reasons the agent may inform local authorities. Moreover, the agent can send an alarm to the driver of the vehicle via the mobile device comprised in the vehicle.

One aspect of the method relates to monitoring the vehicle, when the vehicle is leaving the restricted area. When the vehicle intends to leave the restricted area it may be monitored by the central processing unit and instructed to travel at an appropriate speed, e.g. an appropriate speed for pedestrians or a legal speed, on a track determined by the central processing, e.g. an approved GPS track. For this purpose, when the engine of the vehicle is started, the mobile device comprised in the vehicle may send a message indicating that the engine has started to the central processing unit. The central processing unit may monitor the vehicle using the second and first electronic system. The central processing unit may monitor the vehicle additionally by using GPS data received from the vehicle. Any deviation from the approved GPS track may be reported by the central processing unit to local authorities. Additionally, the central processing unit may cause the brakes of the vehicle to be engaged remotely. On its way out of the restricted area, each vehicle of a plurality of vehicles may be sequentially monitored within the restricted area and the adjacent area surrounding the restricted area by the central processing unit. The database of the central processing unit may be updated in real time. The central processing unit may stop monitoring a vehicle when it has crossed the outer perimeter, i.e. the border between the adjacent area surrounding the restricted area and the area outside the outer perimeter.

The present disclosure further relates to a system for granting access to a restricted area, the restricted being confined by an inner perimeter and being surrounded by an adjacent area, the adjacent area being confined by the inner perimeter and an outer perimeter. The system comprises a central processing unit configured to pair with a mobile device comprised in a vehicle and to manage access to the restricted area by monitoring an area outside the outer perimeter by determining an instant speed of the vehicle and interrogating the vehicle to check for access authorization and data identification using a first electronic system; by determining that the instant speed of the vehicle is too high if the instant speed exceeds a speed limit; by determining, at the central processing unit, whether the vehicle is authorized to access the restricted area; upon determination that the vehicle is authorized to access the restricted area, by granting access to the adjacent area surrounding the restricted area if the speed is not too high; otherwise instructing the vehicle to slow down its speed; by monitoring the adjacent area surrounding the restricted area by determining an instant speed of the vehicle by using a second electronic system; and upon determination that the instant speed of the vehicle does not exceed a speed limit deemed dangerous for pedestrians, by granting access to the restricted area.

Upon determination that the instant speed of the vehicle is too high within the area outside the outer perimeter, the central processing unit may be further configured to broadcast an alarm to local authorities.

The first and second electronic systems may be interconnected by short and/or long range wireless communications. The first electronic system may thus apart from the central processing unit inform the second electronic about an incoming vehicle and request a concurrent monitoring by the second electronic system. The second electronic system may thus apart from the central processing unit inform the first electronic system about a vehicle leaving the restricted or adjacent area and request a concurrent or subsequent monitoring by the first electronic system. If a direct wireless connection from the central processing unit to any of the first and second electronic is impaired or down, the central processing may employ the respective other first or second electronic system as a router to establish a wireless connection to any of the first and second electronic system.

One aspect of the system relates to the determination of the geographical position of the vehicle. The mobile device comprised in the vehicle may be configured to determine the geographical position of the vehicle and to communicate the geographical position of the vehicle to the central processing unit. The mobile device may determine the geographical position of the vehicle by accessing GPS data of a GPS receiver installed in the vehicle. The mobile device may communicate the geographical position of the vehicle upon a request of the central processing unit.

The system may further comprise various means for granting and denying access to the restricted area or the adjacent area surrounding the restricted area. Specifically, the system may comprise traffic lights at the outer perimeter and/or the inner perimeter granting or denying access. Specifically the system may comprise means for barring access to the restricted area.

Different implementations of the present invention are shown in the drawings and will be described and discussed below.

DETAILED DESCRIPTION

Figure 1:
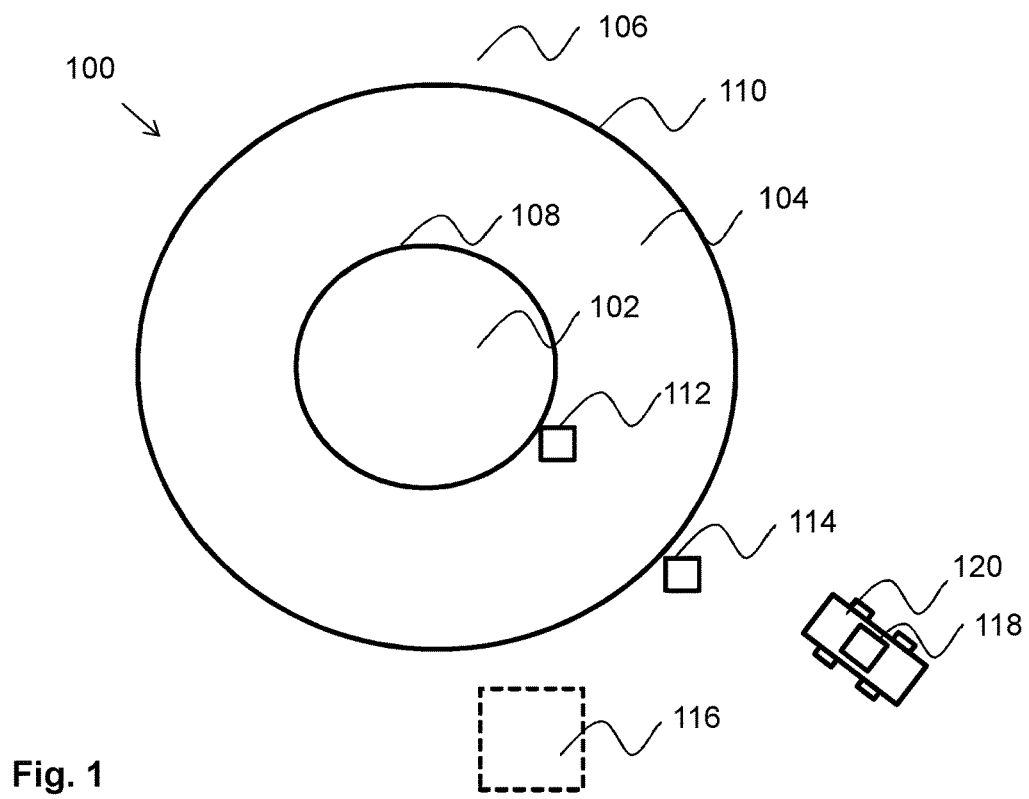
FIG. 1 shows a diagram showing a restricted area and an adjacent area.

FIG. 1 shows a restricted area 102 which is surrounded by an adjacent area 104. The restricted area 102 is confined by inner perimeter 108. The adjacent area is confined by inner perimeter 108 and outer perimeter 110. A first electronic system 114 is located at the outer perimeter and second electronic system 112 is located at the inner perimeter 108. The first electronic system 114 and the second electronic system 112 are interconnected and connected to the central processing unit 116 by means of radio communications. The central processing unit 116 monitors the areas via the first electronic system 114 and the second electronic system 116. A vehicle 120 located in the area 106 outside the outer perimeter 110 wishes to access the restricted area. The vehicle 120 contains a mobile device 118 to communicate with the first electronic system 114 and the second electronic system 112. The central processing unit 116 pairs with the mobile device 118 contained in the vehicle 118.

Figure 2:
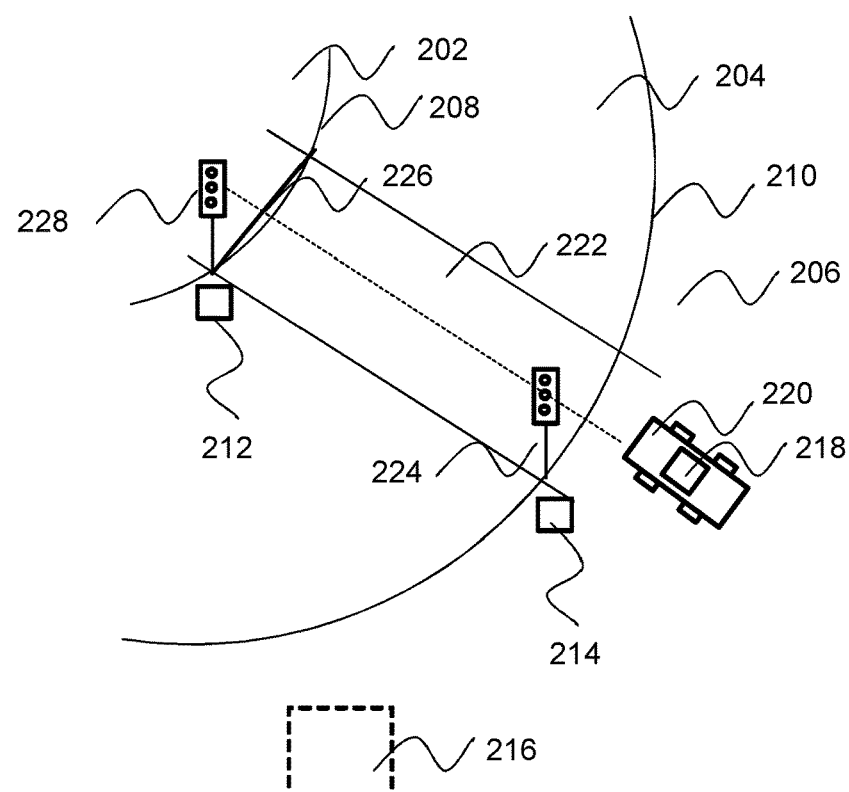
FIG. 2 shows a section of the diagram of FIG. 1 in more detail.
Figure 3:
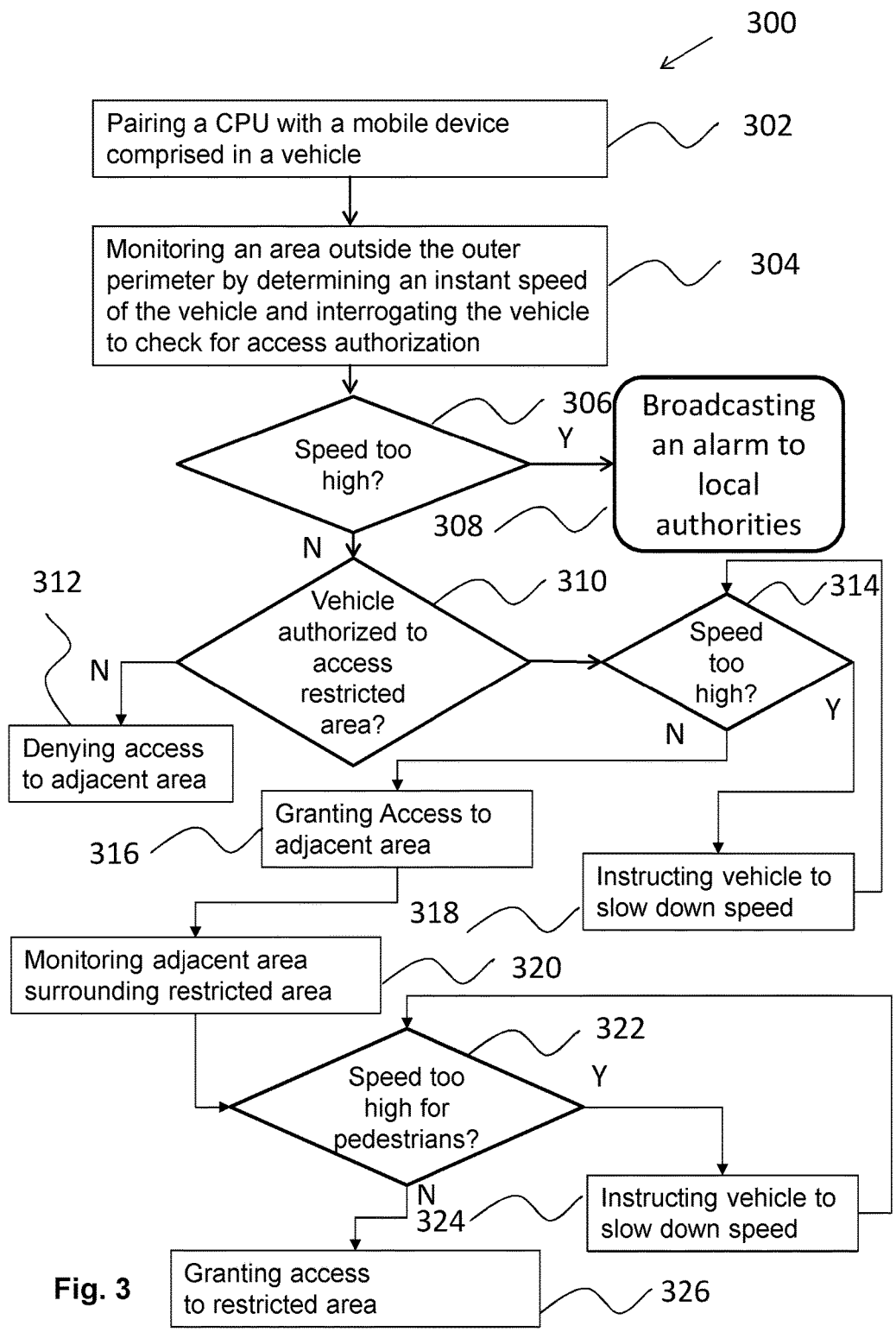
FIG. 3 shows a flow graph of a method for granting access to a restricted area.

FIG. 2 shows a section of the diagram of FIG. 1 in more detail. A road 222 leads from the area 206 outside the outer perimeter 210 via the adjacent area 204 to the restricted area 202. The first electronic system 214 located at the road 222 at the outer perimeter 210 controls a traffic light 224 for granting or denying access to the adjacent area 204. The second electronic system 212 controls a traffic light 228 and a bar 226 for granting access to the restricted area 202. The first and second electronic systems are interconnected by short or long range wireless communications such as Bluetooth and Wireless Fidelity and also communicate to the central processing unit 216. The central processing unit 216 contains a processor, internal memory and a database in order to manage access to the restricted area for a plurality of vehicles. The central processing unit 216 is able to send/receive data information compatible with GSM or UMTS/3G or LTE/4G or 5G and contain the map of the restricted area 202 and can monitor speed and position of vehicles in the restricted area 202 and the adjacent area 204 surrounding the restricted area 202. The vehicle 220 contains a GPS receiver to determine its geographical position and a mobile device 218 to communicate its geographical position to the central processing unit 216 via the first electronic system 214 and alternatively or concurrently via the second electronic system 212. However, determination of the geographic position of the vehicle 220 is not limited to a GPS based position determination. The geographic position can be determined by any appropriate method based on proximity detection, triangulation using received signal strength or time of arrival and angle of arrival. These methods can be implemented in the first or second electronic system or implemented in the central processing unit 216. For example, the first electronic system 214 may employ radar to determine the position of the vehicle 220. Alternatively, the vehicle may itself may determine its position by evaluating cellular radio signals for triangulation.

In order to access the restricted area 202, the vehicle 220 pairs with the central processing unit and its database, e.g. by sending an access request containing data identification such as license plate, owner, driver name and cell number, type and colour of the vehicle, cargo type weight and obtain access authorization.

The central processing unit 216 implements a method for granting and denying access to the restricted area 202 which will be described in more detail with reference to FIG. 2.

The central processing unit 216 pairs with the mobile device 218 of the vehicle 120, stage 302, via the first electronic system 214. The first electronic system 214 monitors the area outside the outer perimeter by determining an instant speed of the vehicle 220 and interrogates the vehicle 220 to check for access authorization in stage 304. It compares the instant speed with a speed limit, e.g. a legal speed limit in stage 306. If the speed is too high it broadcasts an alarm to local authorities in stage 308. Otherwise the first electronic system 214 determines based on the interrogation result whether the vehicle 220 is authorized to access the restricted area 202 in stage 310. If this is not the case the first electronic system 214 denies access to the adjacent area 204 surrounding the restricted area 202. The first electronic system 214 checks if the speed is too high for entering the adjacent area 204 in stage 314. If the speed is too high, it instructs the vehicle 220 to slow down its speed. If the speed is not too high, e.g. if the vehicle has slowed down sufficiently, the first electronic system 214 grants access to the adjacent area by setting the traffic light 224 to green. The first electronic system 214 continues monitoring the vehicle when it has entered the adjacent area 204. The second electronic system 212 begins monitoring the vehicle when it has entered the adjacent area 204 and monitors the vehicle in parallel to the first electronic system 214. For this purpose, the first electronic system 214 informs the second electronic system 212 when the vehicle has crossed the outer perimeter. The second electronic system 212 determines the instant speed of the vehicle and may additionally request the instant speed to be communicated by the vehicle itself or by the first electronic system 214. The second electronic system 212 determines whether the instant speed of the vehicle is too high for pedestrians in stage 322. If this is the case it denies access by setting the traffic light 228 to red and lowering the bar 226 and instructs the vehicle to slow down its speed in stage 324. If this is not the case, the second electronic system 212 grants access to the restricted area 202 by setting the traffic light 228 to green and opening the bar 226.

The central processing unit monitors the vehicle 220 continuously within the restricted area via the second electronic system 212. It keeps a database with authorization and authorization expiration of vehicles. As soon as any irregularities occur the central processing unit informs the driver of the vehicle. It may instruct the driver to return to the approved GPS track or to slow down the speed of the vehicle at any time.

The central processing unit may request an identification of the driver or a camera image of the driver taken from a camera installed inside the driver cabin from the vehicle. The driver-id or the camera image may be communicated from the mobile device to the central processing unit. The central processing may provide the driver-id or the camera image of the driver to law enforcement authorities. The law enforcement authorities may access databases of known potential terrorists or a database of criminals. If the law enforcement authorities detect a potential terrorist or a criminal, an indication about this detection may be communicated to the central processing unit. The central processing unit 216 may then remotely engage the brakes of the vehicle. Moreover, the central processing unit 216 may remotely lock the doors of the vehicle. Furthermore, the central processing unit may remotely sound off the horn of the vehicle. As the horn is sounded off, pedestrians are warned about a potentially dangerous vehicle or a potential immanent terrorist attack.

In order to remotely engage the brakes, the door lock or the horn of the vehicle, the mobile device 218 contained in the vehicle may be connected to ABS and cruise control via an internal CAN bus to control the speed of the vehicle or to engage the brakes or the throttle. The mobile device 218 may be further connected to the door electronics and the horn electronics.

The central processing unit 216 may inform local authorities about a potential terrorist being trapped in the cabin of the vehicle as well as the current position of the vehicle. Local authorities may then arrest or shoot the potential terrorist.

The invention claimed is:

1. A method for granting access to a restricted area, the restricted area being confined by an inner perimeter and being surrounded by an adjacent area, the adjacent area being confined by the inner perimeter and an outer perimeter, the method comprising:
    pairing a central processing unit with a mobile device comprised in a vehicle, wherein the central processing unit manages access to the restricted area;
    monitoring, from the central processing unit, an area outside the outer perimeter by determining an instant speed of the vehicle and interrogating the vehicle to check for access authorization and data identification using a first electronic system;
    determining, at the central processing unit, that the instant speed of the vehicle is too high if the instant speed exceeds a speed limit;
    determining, at the central processing unit, whether the vehicle is authorized to access the restricted area based on the interrogating;
    upon determination that the vehicle is authorized to access the restricted area, granting access to the adjacent area surrounding the restricted area if the speed is not too high; otherwise instructing the vehicle to slow down its speed;
    monitoring, from the central processing unit, the adjacent area surrounding the restricted area by determining an instant speed of the vehicle by using a second electronic system;
    upon determination that the instant speed of the vehicle does not exceed a speed limit deemed dangerous for pedestrians, granting access to the restricted area;
    sending, from the central processing unit, to the vehicle a GPS track a driver of the vehicle shall follow to drive to a place within the restricted area;
    remotely engaging, by the central processing unit, the brakes of the vehicle upon determination that the vehicle has left an approved GPS track;
    sending, by the central processing unit, an alarm to local authorities upon determination that the vehicle has left an approved GPS track;
    monitoring the area outside the outer perimeter by using the first electronic system comprises applying long range radio communications; and
    wherein interrogating the vehicle to check for access authorization and data identification using the first electronic system comprises applying short range radio communications and wherein monitoring the adjacent area surrounding the restricted area and the restricted area using the second electronic system comprises applying short range radio communications.

2. The method of claim 1, further comprising:
    upon determination that the instant speed of the vehicle is too high within the area outside the outer perimeter, broadcasting an alarm to local authorities from the central processing unit.

3. The method of claim 1, wherein instructing the vehicle to slow down its speed comprises receiving an acknowledgement from the vehicle with respect to the instructing and granting access to the area surrounding the restricted area if the speed has been slowed down sufficiently.

4. The method of claim 1, wherein determining the instant speed by using the first electronic system comprises measuring the instant speed of the vehicle by radar.

5. The method of claim 1, wherein determining the instant speed of the vehicle by using the second electronic system comprises evaluating GPS signals received from the vehicle.

6. The method of claim 1, further comprising:
    monitoring, from the central processing unit, the restricted area by determining an instant speed of the vehicle by using the first electronic system.

7. The method of claim 6, wherein determining the instant speed of the vehicle comprises evaluating GPS signals received from the vehicle.

8. The method of claim 1, further comprising:
    interrogating the vehicle by an agent using short range communications.

9. The method of claim 8, further comprising:
    informing authorities upon determination that the authentication of the vehicle has expired.

10. A system for granting access to a restricted area, the restricted area being confined by an inner perimeter and being surrounded by an adjacent area, the adjacent area being confined by the inner perimeter and an outer perimeter, the system comprising:
    a central processing unit configured to pair with a mobile device comprised in a vehicle and to manage access to the restricted area by:
    monitoring an area outside the outer perimeter by determining an instant speed of the vehicle and interrogating the vehicle to check for access authorization and data identification using a first electronic system;
    determining that the instant speed of the vehicle is too high if the instant speed exceeds a speed limit;
    determining, at the central processing unit, whether the vehicle is authorized to access the restricted area;
    upon determination that the vehicle is authorized to access the restricted area, granting access to the adjacent area surrounding the restricted area if the speed is not too high; otherwise instructing the vehicle to slow down its speed;
    monitoring the adjacent area surrounding the restricted area by determining an instant speed of the vehicle by using a second electronic system;
    upon determination that the instant speed of the vehicle does not exceed a speed limit deemed dangerous for pedestrians, granting access to the restricted area;
    sending, from the central processing unit, to the vehicle a GPS track a driver of the vehicle shall follow to drive to a place within the restricted area;
    remotely engaging, by the central processing unit, the brakes of the vehicle upon determination that the vehicle has left an approved GPS track;
    sending, by the central processing unit, an alarm to local authorities upon determination that the vehicle has left an approved GPS track;
    monitoring the area outside the outer perimeter by using the first electronic system comprises applying long range radio communications; and
    wherein interrogating the vehicle to check for access authorization and data identification using the first electronic system comprises applying short range radio communications and wherein monitoring the adjacent area surrounding the restricted area and the restricted area using the second electronic system comprises applying short range radio communications.

11. The system of claim 10, wherein the central processing unit is further configured to manage access to the restricted area by:
    upon determination that the instant speed of the vehicle is too high within the area outside the outer perimeter, broadcasting an alarm to local authorities from the central processing unit.

12. The system of claim 10, wherein instructing the vehicle to slow down its speed comprises receiving an acknowledgement from the vehicle with respect to the instructing and granting access to the area surrounding the restricted area if the speed has been slowed down sufficiently.

13. The system of claim 10, wherein determining the instant speed by using the first electronic system comprises measuring the instant speed of the vehicle by radar.

14. The system of claim 10, wherein determining the instant speed of the vehicle by using the second electronic system comprises evaluating GPS signals received from the vehicle.

15. The system of claim 10, wherein the central processing unit is further configured to manage access to the restricted area by:

monitoring, from the central processing unit, the restricted area by determining an instant speed of the vehicle by using the first electronic system.

16. The system of claim 10, wherein determining the instant speed of the vehicle comprises evaluating GPS signals received from the vehicle.

\* \* \* \* \*